United States Patent
Autie et al.

(10) Patent No.: US 11,120,168 B2
(45) Date of Patent: Sep. 14, 2021

(54) METHOD FOR PROTECTING AN FPGA AGAINST NATURAL RADIATIONS

(71) Applicant: SAFRAN ELECTRONICS & DEFENSE, Paris (FR)

(72) Inventors: Cédric Autie, Paris (FR); Thibault Porteboeuf, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/254,597

(22) PCT Filed: Jun. 19, 2019

(86) PCT No.: PCT/EP2019/066305
§ 371 (c)(1),
(2) Date: Dec. 21, 2020

(87) PCT Pub. No.: WO2019/243479
PCT Pub. Date: Dec. 26, 2019

(65) Prior Publication Data
US 2021/0248276 A1    Aug. 12, 2021

(30) Foreign Application Priority Data
Jun. 21, 2018 (FR) ..................... 18 55483

(51) Int. Cl.
*G06F 21/76* (2013.01)
*G06F 1/10* (2006.01)
(Continued)

(52) U.S. Cl.
CPC .............. *G06F 21/76* (2013.01); *G06F 1/10* (2013.01); *G06F 30/394* (2020.01); *G06F 30/398* (2020.01)

(58) Field of Classification Search
CPC ...... G06F 21/76; G06F 30/392; G06F 30/394; G06F 30/398; G06F 30/331; G06F 30/34; G06F 30/347; G06F 1/10; G11C 7/24
(Continued)

(56) References Cited

U.S. PATENT DOCUMENTS 9,054,684 B1    6/2015 Sood et al.
9,484,919 B1   11/2016 Jain et al.
(Continued)

FOREIGN PATENT DOCUMENTS

CN    103500125 B    7/2016

*Primary Examiner* — Paul Dinh
(74) *Attorney, Agent, or Firm* — Muncy, Geissler, Olds & Lowe, P.C.

(57) ABSTRACT

A protection method for protecting an FPGA against natural radiation, the method comprising the steps of: defining at least one category of constraining signals defined so that a predetermined placement and routing tool cannot route more than a determined maximum number of different constraining signals to any one zone of the surface of the FPGA; replicating an initial logic module in order to obtain a plurality of replicated logic modules forming a replicated logic cell; and associating constraining signals with the replicated logic modules in such a manner that the number of constraining signals associated with the replicated logic cell is greater than a determined maximum number in order to force the placement and routing tool to place the replicated logic modules of the replicated logic cell in distinct zones of the surface of the FPGA.

9 Claims, 5 Drawing Sheets

(51) Int. Cl.
   *G06F 30/398* (2020.01)
   *G06F 30/394* (2020.01)
(58) Field of Classification Search
   USPC .......................................................... 716/119
   See application file for complete search history.

(56) References Cited

U.S. PATENT DOCUMENTS 10,558,777 B1 * 2/2020 Yu .......................... G06F 30/394
10,831,968 B1 * 11/2020 Leow .................... G06F 30/347

* cited by examiner

METHOD FOR PROTECTING AN FPGA AGAINST NATURAL RADIATIONS

The invention relates to the field of protection methods for protecting an FPGA against natural radiation.

BACKGROUND OF THE INVENTION

In space, a field programmable gate array (FPGA) is subjected to a space radiation environment that results from several phenomena, including cosmic radiation, solar flares, and solar wind.

Likewise, in the atmosphere, an FPGA is subjected to an atmospheric radiation environment that results in particular from the interaction of cosmic radiation with atoms of the atmosphere.

Such an FPGA is thus exposed to heavy ions and to protons that result from natural radiation.

It can happen that these particles disturb the FPGA, and in particular produce single event upsets (SEUs) in the flip-flop bistables of the FPGA. Bit values of data previously sampled by the flip-flop bistables are then inverted.

Thus, as can be seen in FIG. 1, a particle P causes the output of a flip-flop bistable 1 to invert: its output is at 1 instead of being at 0.

With reference to FIG. 2, one existing mechanism for correcting this type of disturbance consists in triplicating sensitive bistables 2, and in associating the three triplicated bistables 2 with a majority voter 3. The inputs of the bistables 2 are corrected from the results of the vote taken by the voter 3. This is referred to as "local triple modular redundancy". That mechanism operates very well, providing only one bistable 2 among the three bistables 2 is in error.

Below in this document, the term "TMR cell" is used to designate a triple modular redundancy cell comprising a set of three triplicated bistables 2 and a voter 3.

In the context of a development project seeking to implement an inertial measurement unit for a space launcher, an FPGA has been exposed to an environment of heavy ions and of protons by using a particle accelerator. It has been found that using TMR serves only to halve errors compared with using bistables that are not triplicated. That improvement is insufficient given the requirements included in the technical specifications associated with the inertial measurement unit.

On analysis, it is found that the placement and routing tool used for placing and routing the FPGA has a tendency to keep together the three bistables of any given TMR cell for the purpose of optimizing timings. It is also found that each of the particles to which the FPGA is subjected is likely to disturb a surface area that is greater than the area occupied by a single bistable. A single particle can thus hit two bistables in the same TMR cell and corrupt its operation. This is referred to herein as a "multiple bit upset" (MBU).

Thus, in FIG. 3, since the states of the outputs of two of the bistables 5 of the TMR cell 6 have been inverted, it can be seen that the voter 7 is not capable of correcting effectively the effects of the particle P.

A first solution for mitigating that problem would be to use FPGA technology with coarser etching. When the etching is coarser, the bistables are naturally further apart from one another, with the effect of making them less sensitive to MBUs when using TMR. Unfortunately, the coarser the etching, the slower the FPGA. The needs of an inertial measurement unit in terms of computation and bandwidth do not enable that solution to be used.

A second solution would be to take each submodule of the FPGA and triplicate each submodule individually, while ensuring that the three instances of any given submodule are physically well separated. A voter can then discriminate against any one of the three instances by voting on the three results. Nevertheless, that solution presents numerous drawbacks. Firstly, it requires a very large amount of logic since all of the submodules are triplicated (in bistable TMR, only the bistables are triplicated, and not the combinatorial portion). Consequently, it can be found to be necessary to partition that solution over a plurality of FPGAs, or at the very least over a larger number of FPGAs. Furthermore, that solution presents limits when performing recursive calculations. Specifically, if a first instance of the submodule has failed, it is then not possible to correct that failure without reloading the entire context of the submodule from the context of one of the other two instances, which is technically complicated. Thus, if a second instance of the submodule also fails after the first instance has failed, the voter can no longer make the correction and the entire submodule is then declared non-functional.

A third solution would be to take each submodule of the FPGA and duplicate each submodule individually, while ensuring that both instances of any given submodule are physically well separated. Thereafter, a comparator can determine whether both instances provide the same result, thereby indicating proper operation. If both of them do not provide the same result, it is not possible to identify which instance has failed, and it is necessary to relaunch the calculation(s). The advantage of that solution is that it requires fewer resources than triplicating the submodules (see the second solution). Nevertheless, that third solution implies greater complexity. Furthermore, it requires the entire combinatorial portion to be duplicated unlike bistable TMR in which only the bistables are duplicated (in general, the design of an FPGA makes much greater use of combinatorial logic than it does of bistables). Finally, that third solution is problematic when performing recursive calculations, since the error of a submodule accumulates over time.

A fourth solution would be to triplicate all of the bistables, to use a voter with return to correct the failed bistable, and to position all of the bistables "by hand". The bistables would then be far enough apart to provide protection against the MBU effect. That solution is advantageous since, while using fewer resources, it serves to provide protection against MBUs, and above all to correct the failed bistable at each clock pulse. Thus, it is entirely possible to carry out recursive calculations in situations where solutions based on triplicating or duplicating submodules, as described above, present limits. In contrast, manual positioning of the bistables constitutes work that is very long and tedious, requiring numerous iterations in order to achieve the desired timings, and above all needing to be redone in part or in full whenever the design is updated. That is thus a solution that is advantageous in theory, but in reality it is not long-lasting and very risky.

A fifth solution would be to use an FPGA that is "radiation-hardened", i.e. that withstands natural radiation. In theory, that solution appears to be very advantageous, since such components can have TMR bistables directly in their silicon. Nevertheless, such an FPGA presents an extremely high recurring cost.

OBJECT OF THE INVENTION

An object of the invention is to provide a protection method for protecting an FPGA against natural radiation that does not reduce the performance of the FPGA, that is effective and simple to implement, and that is inexpensive.

SUMMARY OF THE INVENTION

In order to achieve this object, there is provided a protection method for protecting an FPGA against natural radiation, the FPGA presenting a surface subdivided into a plurality of zones, and the protection method comprising the steps of:
  defining at least one category of constraining signals, the category of constraining signals being defined so that a predetermined placement and routing tool cannot route more than a determined maximum number of different constraining signals to any one zone of the surface of the FPGA;
  replicating an initial logic module in order to obtain a plurality of replicated logic modules forming a replicated logic cell; and
  associating constraining signals with the replicated logic modules in such a manner that the number of constraining signals associated with the replicated logic cell is greater than a determined maximum number in order to force the placement and routing tool to place the replicated logic modules of the replicated logic cell in distinct zones of the surface of the FPGA.

By means of the protection method of the invention, the placement and routing tool automatically places the replicated logic modules (e.g. flip-flop bistables) of the replicated logic cell (e.g. a TMR cell) in distinct zones of the FPGA. The replicated logic modules of any one replicated logic cell are thus spaced apart, which serves to reduce the risk of an MBU occurring.

The FPGA is thus protected effectively against natural radiation without reducing its performance and in a manner that is simple and inexpensive.

There is also provided an FPGA in which the above-described protection method is implemented.

There is also provided an electric circuit card having said FPGA mounted thereon.

There is also provided an inertial measurement unit including an electric circuit card as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

In this example, the invention is implemented in an FPGA of the IGLOO2 family manufactured by the component manufacturer Microsemi. The FPGA is manufactured with 65 nanometer (nm) etching. The tool used for the placement and routing of the FPGA is a placement and routing tool of the Libero family.

Figure 1:
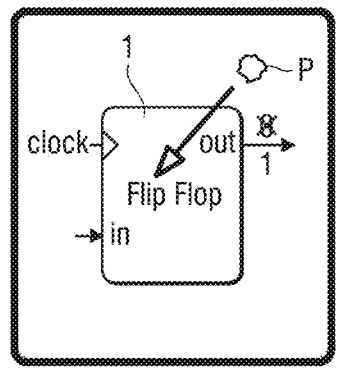
FIG. 1 shows a flip-flop bistable.
Figure 2:
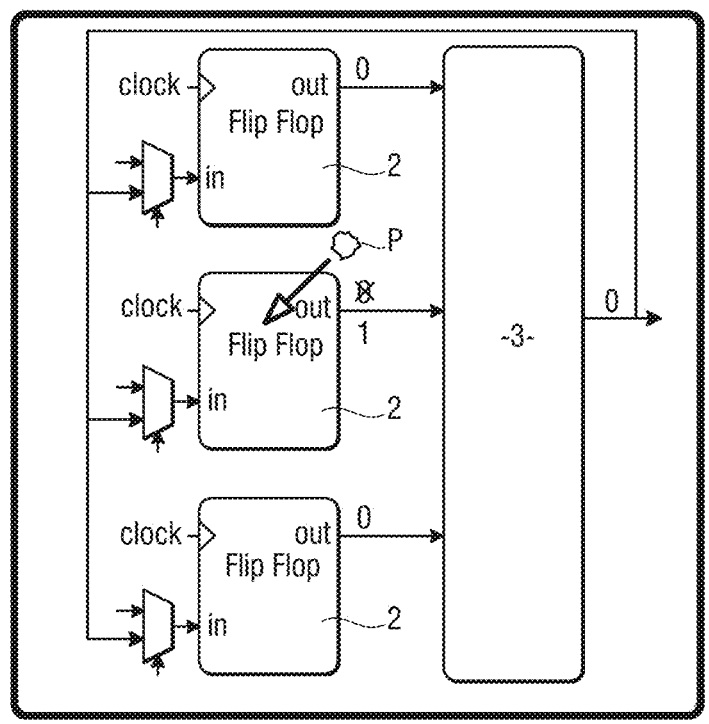
FIG. 2 shows a TMR cell being subjected to an SEU.
Figure 3:
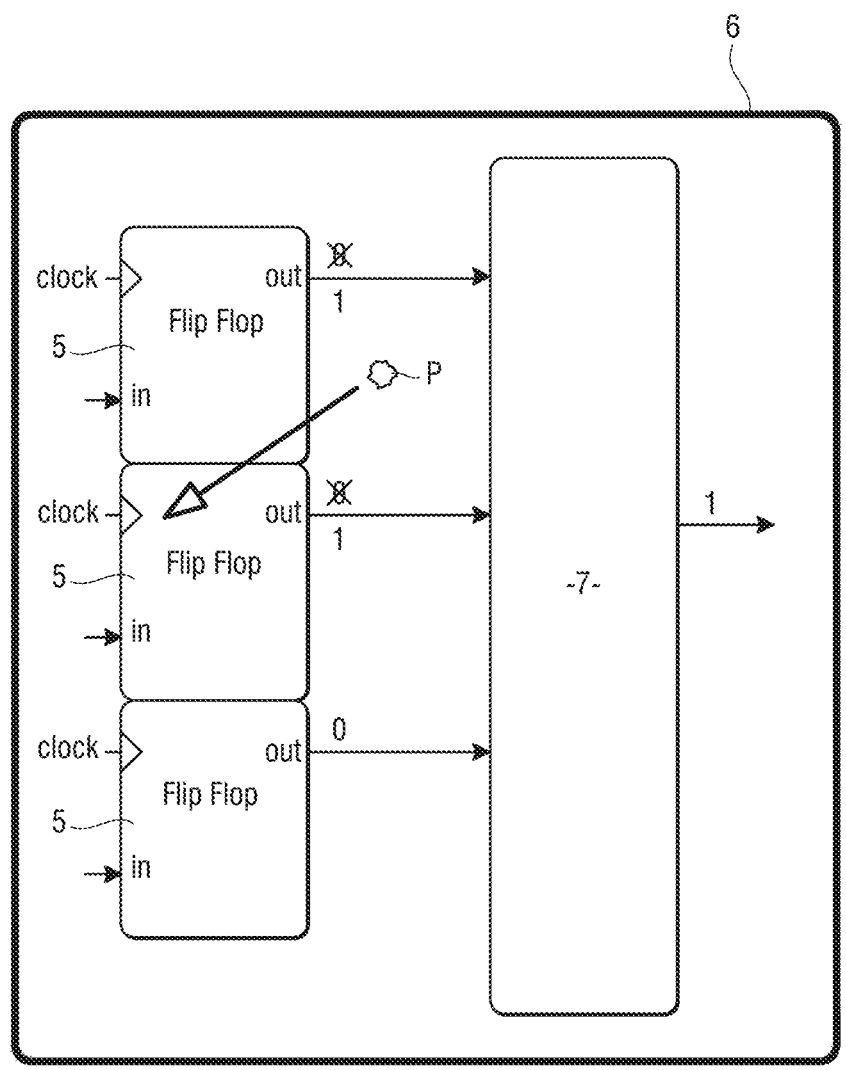
FIG. 3 shows a TMR cell being subjected to an MBU.
Figure 4:
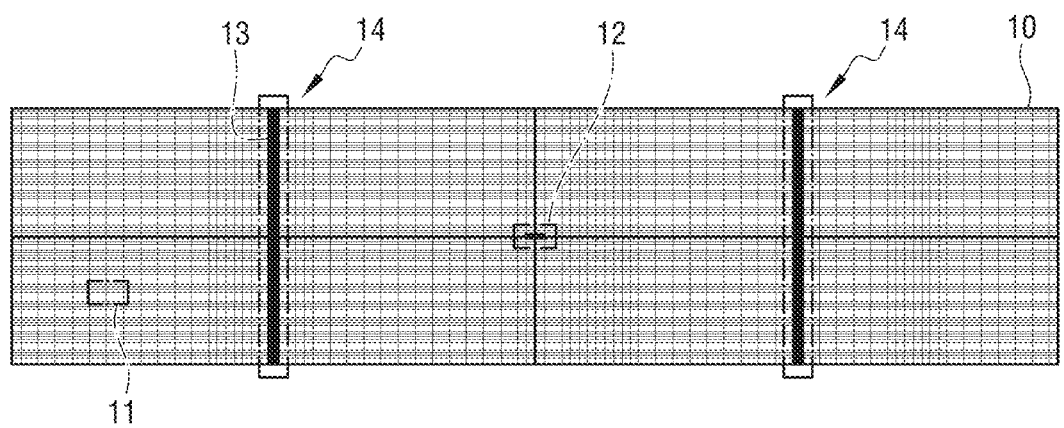
FIG. 4 shows row global buffers and logic groups.

With reference to FIG. 4, the logic layer 10 of the FPGA, which is formed on silicon, presents a surface that is subdivided into numerous zones. In this example, each zone is defined as including one logic group (or "cluster") 11. In this example, each logic group 11 comprises twelve flip-flop bistables, twelve lookup tables (LUTs), and twelve buffers.

The logic layer 10 of the FPGA also comprises routing resources, which include global signal routing resources. In this example, the global signals comprise clock signals and reset signals.

The global signal routing resources comprise global buffers 12 and row global buffers 13.

In this example, there are eight global buffers 12 (where this number depends on the size of the FPGA, and certain FPGAs in the same family have sixteen). Each global buffer 12 is a multiplexer that generates an independent global signal. It can be controlled from various sources, e.g. from an external clock or from an internal logic signal.

The row global buffers 13 are situated on two vertical strips 14 within the FPGA. Each row global buffer 13 controls the logic groups 11 situated both in a branch to the left of the row global buffer 13, and also in a branch to the right of it.

When routing the FPGA, the global signals coming from the global buffers 12 are routed to the row global buffers 13. The global signals then reach the logic groups 11 via row global signals coming from the row global buffers 13.

Each global buffer 12 has access to all of the row global buffers 13. Each row global buffer 13 is independent and may also be controlled by internal logic signals.

The logic groups 11 may also be controlled by internal logic signals that are referred to as "inter-cluster" signals and that are not global signals.

In conventional manner, when bistable TMR is used, the placement and routing tool attempts to position the bistables of any given TMR cell as close together as possible in order to obtain propagation times that are as short as possible.

Thus, in a TMR cell, a clock signal that is common to all three bistables is routed from a single global buffer 12 to the row global buffers 13, and then the bistables of the TMR cell are positioned in a single logic group 11 in order to enable the clock signal to be routed from a single row global buffer 13, and thus in order to be able to simplify the interconnection logic with the voter associated with the TMR cell.

The same applies to the reset signal coming from a single global buffer 12 and then routed to the row global buffers 13. Thus, a logic group 11 containing the three bistables of the TMR cell is connected to a row global buffer 13, which itself produces the clock signal and the reset signal that are common to all three bistables, with these two global signals coming directly from two dedicated global buffers 12.

Nevertheless, using the placement and routing tool, it is not possible to route more than three global signals to any one logic group 11 from a single row global buffer 13.

If each bistable in a single TMR cell uses two global signals that are both distinct from the global signals of the other bistables of the TMR cell, it becomes physically impossible to position the bistables of the TMR cell in a single logic group 11, and the bistables are then naturally spaced apart in different logic groups 11, and thus in different zones of the surface of the FPGA.

Thus, if each bistable of a single TMR cell uses a distinct clock signal, i.e. a clock signal that is different from the clock signals of the other two bistables of the TMR cell, and also uses a distinct reset signal, i.e. a reset signal that is different from the reset signals of the other two bistables of the TMR cell, then there are six global signals per TMR cell.

Since these six global signals are conveyed by six different row global signals, the three bistables of the TMR cell are positioned in logic groups 11 that are different and that are thus spaced apart.

This spacing reduces the risk of MBUs: thereby providing the FPGA with effective protection against natural radiation.

Furthermore, the sensitivity of the bistables to single event transients (SETs) on the clock signals is also reduced, since the clock signals are triplicated.

Implementation of the protection method of the invention is recapitulated below.

The protection method of the invention consists firstly in defining at least one category of constraining signals, with the category of constraining signals being defined so that a predetermined placement and routing tool cannot route more than a determined maximum number of different constraining signals to each zone of the surface of the FPGA.

Figure 5:
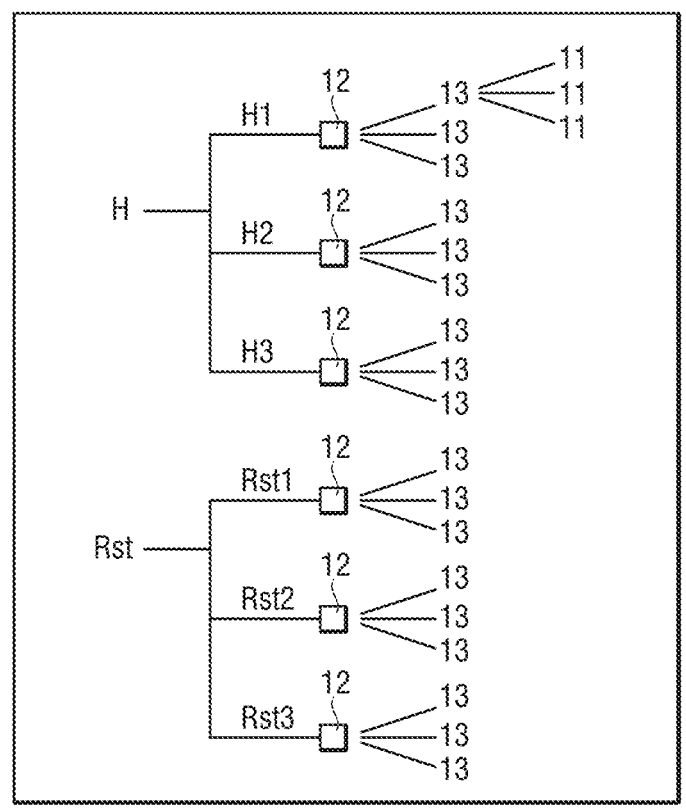
FIGS. 5 and 6 show steps in the protection method of the invention.

In this example, and with reference to FIG. 5, specifically two categories of constraining signals are defined: a first category of constraining signals that comprise clock signals H, and a second category of constraining signals that comprise reset signals Rst.

The first category comprises a first clock signal H1, a second clock signal H2, and a third clock signal H3.

The second category comprises a first reset signal Rst1, a second reset signal Rst2, and a third reset signal Rst3.

In this example, it is impossible to route more than three global signals (i.e. more than three signals selected from among the clock signals and the reset signals) to a single logic group (or "cluster") 11, and thus to any one zone of the surface of the FPGA (since each zone of the surface of the FPGA comprises one logic group 11). The determined maximum number is thus equal to three.

Thereafter, the protection method consists in replicating an initial logic module in order to obtain a plurality of replicated logic modules forming a replicated logic cell.

Figure 6:
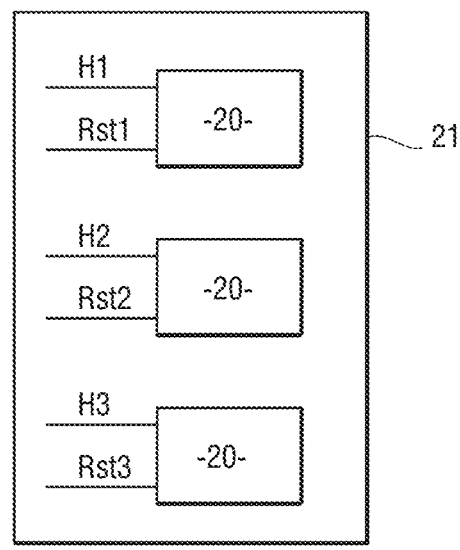

In this example, and with reference to FIG. 6, the initial logic module is specifically a flip-flop bistable 20, replication consists in triplication, and the replicated logic cell is a TMR cell 21.

Thereafter, the protection method consists in associating constraining signals with the replicated logic modules in such a manner that the number of constraining signals associated with the replicated logic cell is greater than a determined maximum number in order to force the placement and routing tool to place the replicated logic modules of the replicated logic cell in distinct zones of the surface of the FPGA.

Specifically, each bistable 20 is associated in this example with a distinct clock signal and with a distinct reset signal, i.e. two constraining signals per bistable, and thus six constraining signals per TMR cell: the placement and routing tool places the triplicated bistables 20 of the TMR cell 21 in distinct zones of the surface of the FPGA.

Figure 7:
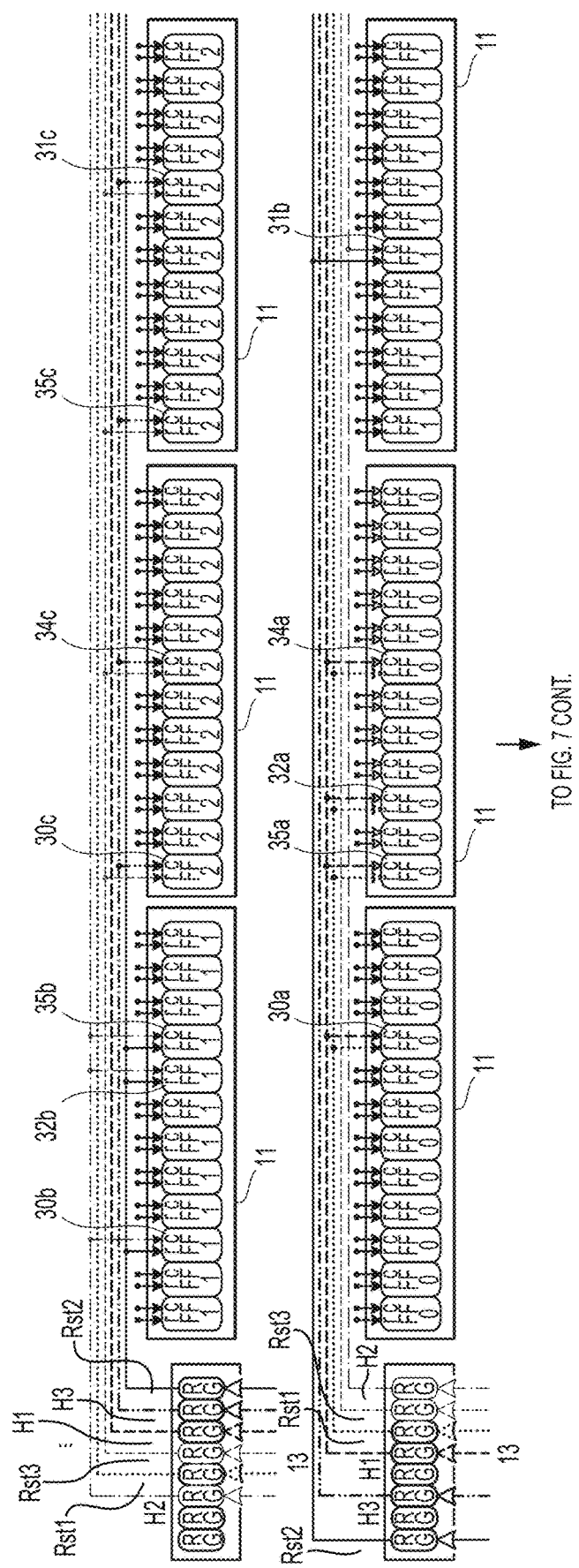
FIG. 7 shows a logic layer of an FPGA.
Figure 7:
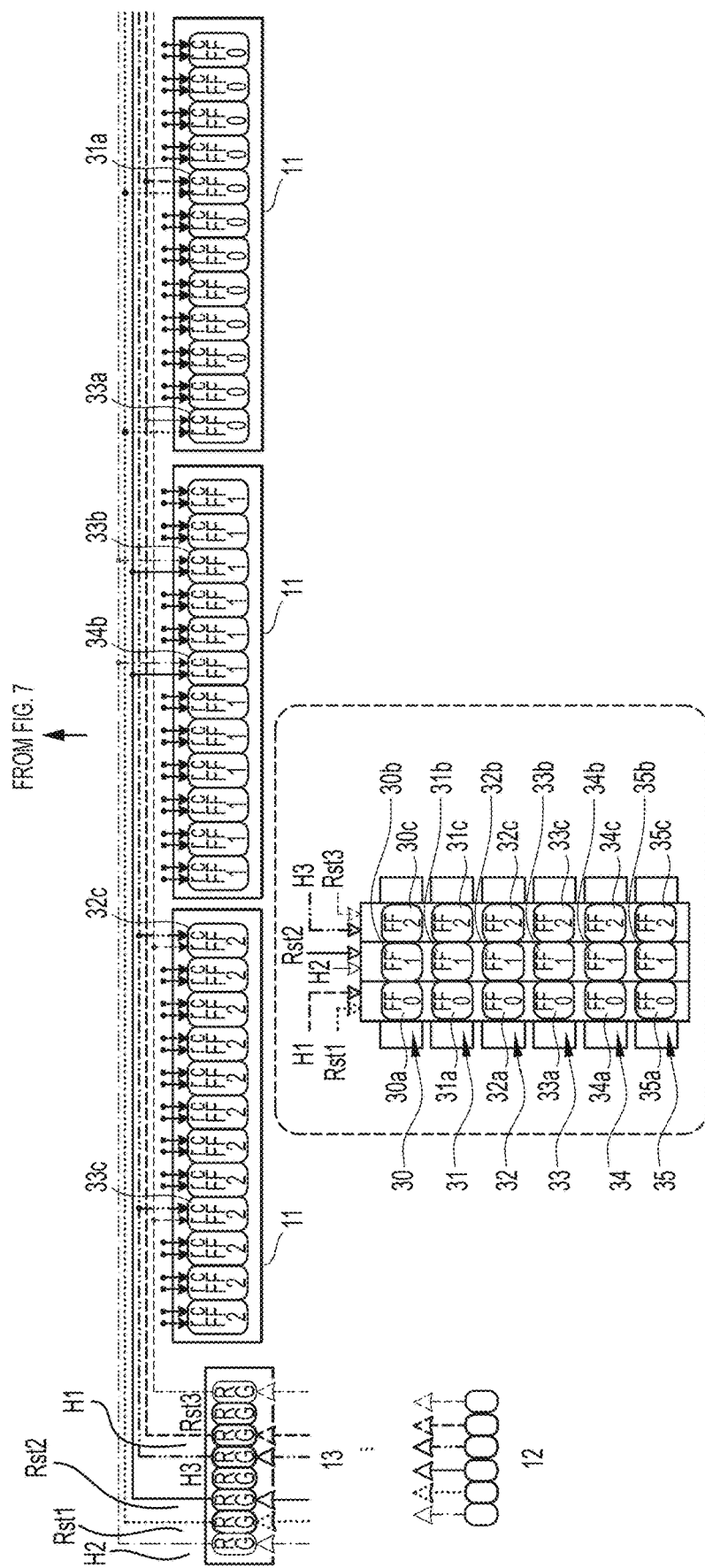

With reference to FIG. 7, the protection method of the invention is implemented with six TMR cells.

The TMR cell 30 comprises the bistable 30a, the bistable 30b, and the bistable 30c. The bistable 30a is associated with the first clock signal H1 and with the first reset signal Rst1. The bistable 30b is associated with the second clock signal H2 and with the second reset signal Rst2. The bistable 30c is associated with the third clock signal H3 and with the third reset signal Rst3.

The TMR cell 31 comprises the bistable 31a, the bistable 31b, and the bistable 31c. The bistable 31a is associated with the first clock signal H1 and with the first reset signal Rst1. The bistable 31b is associated with the second clock signal H2 and with the second reset signal Rst2. The bistable 31c is associated with the third clock signal H3 and with the third reset signal Rst3.

The TMR cell 32 comprises the bistable 32a, the bistable 32b, and the bistable 32c. The bistable 32a is associated with the first clock signal H1 and with the first reset signal Rst1. The bistable 32b is associated with the second clock signal H2 and with the second reset signal Rst2. The bistable 32c is associated with the third clock signal H3 and with the third reset signal Rst3.

The TMR cell 33 comprises the bistable 33a, the bistable 33b, and the bistable 33c. The bistable 33a is associated with the first clock signal H1 and with the first reset signal Rst1. The bistable 33b is associated with the second clock signal H2 and with the second reset signal Rst2. The bistable 33c is associated with the third clock signal H3 and with the third reset signal Rst3.

The TMR cell 34 comprises the bistable 34a, the bistable 34b, and the bistable 34c. The bistable 34a is associated with the first clock signal H1 and with the first reset signal Rst1. The bistable 34b is associated with the second clock signal H2 and with the second reset signal Rst2. The bistable 34c is associated with the third clock signal H3 and with the third reset signal Rst3.

The TMR cell 35 comprises the bistable 35a, the bistable 35b, and the bistable 35c. The bistable 35a is associated with the first clock signal H1 and with the first reset signal Rst1. The bistable 35b is associated with the second clock signal H2 and with the second reset signal Rst2. The bistable 35c is associated with the third clock signal H3 and with the third reset signal Rst3.

It can be seen that the bistables of any one TMR cell are placed in distinct logic groups, i.e. in distinct zones of the surface of the FPGA.

Naturally, the invention is not limited to the embodiment described, but covers any variant coming within the ambit of the invention as defined by the claims.

The FPGA and the placement and routing tool may naturally be different from those described above. The number and the type of constraining signals that are used may likewise be different.

The replication that is performed need not necessarily be triplication: it is possible to replicate each initial logic module some number of times other than three.

The invention claimed is:

1. A protection method for protecting an FPGA against natural radiation, the FPGA presenting a surface subdivided into a plurality of zones, and the protection method comprising the steps of:
   defining at least one category of constraining signals, the category of constraining signals being defined so that a predetermined placement and routing tool cannot route more than a determined maximum number of different constraining signals to any one zone of the surface of the FPGA;
   replicating an initial logic module in order to obtain a plurality of replicated logic modules forming a replicated logic cell; and
   associating constraining signals with the replicated logic modules in such a manner that the number of constraining signals associated with the replicated logic cell is greater than the determined maximum number in order to force the placement and routing tool to place the replicated logic modules of the replicated logic cell in distinct zones of the surface of the FPGA.

2. The protection method according to claim 1, wherein the initial logic module is a flip-flop bistable and the replicated logic cell is a triple modular redundancy cell.

3. The protection method according to claim 1, wherein a first category of constraining signals is defined that comprises clock signals.

4. The protection method according to claim 1, wherein a second category of constraining signals is defined that comprises reset signals.

5. The protection method according to claim 3, wherein a distinct clock signal and a distinct reset signal are associated with each replicated logic module.

6. An FPGA in which there is implemented a protection method according to claim 1.

7. The FPGA according to claim 6, the FPGA comprising global buffers, row global buffers, and logic groups, each zone of the surface of the FPGA comprising one logic group, the FPGA being arranged in such a manner that global signals coming from the global buffers are routed to the row global buffers, the global signals reaching the logic groups by means of row global signals coming from the row global buffers.

8. An electric circuit card having mounted thereon an FPGA according to claim 6.

9. An inertial measurement unit including an electric circuit card according to claim 8.

\* \* \* \* \*